Feb. 8, 1938.　　　I. B. COOPER　　　2,107,854
VEHICLE BODY CONSTRUCTION
Filed April 21, 1937　　　2 Sheets-Sheet 1
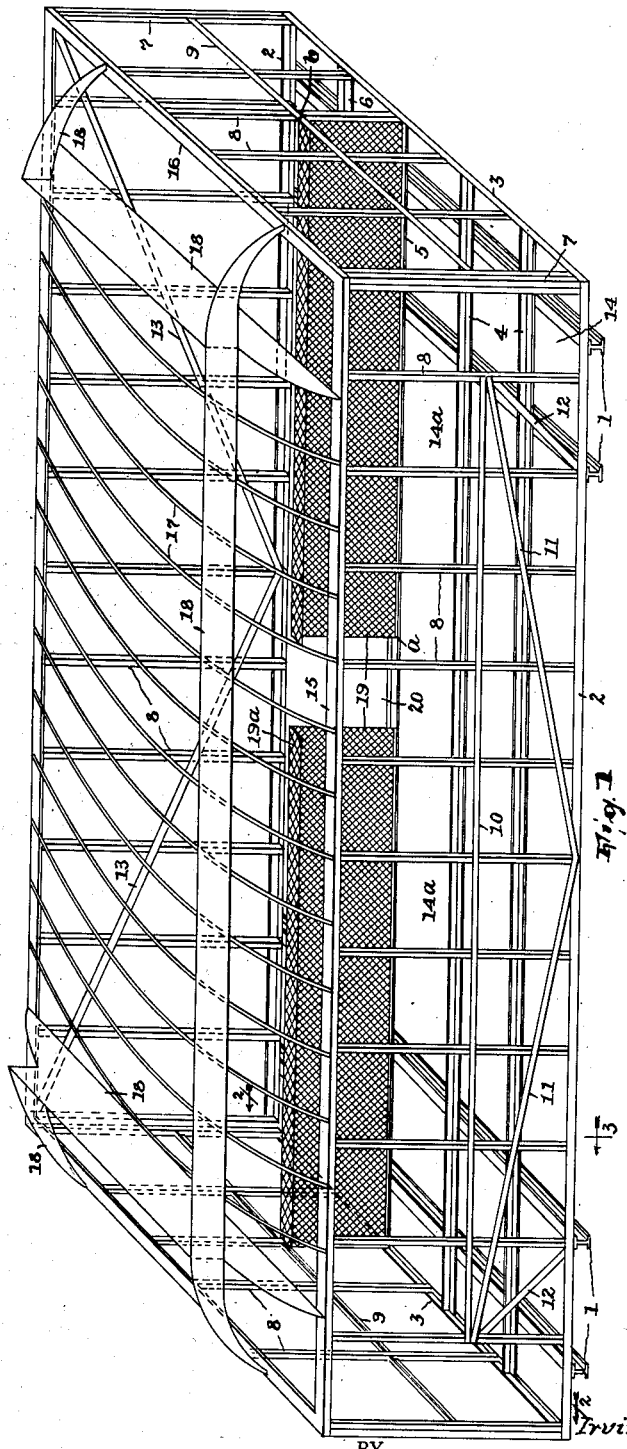
INVENTOR.
Irving B. Cooper,
BY
ATTORNEY.

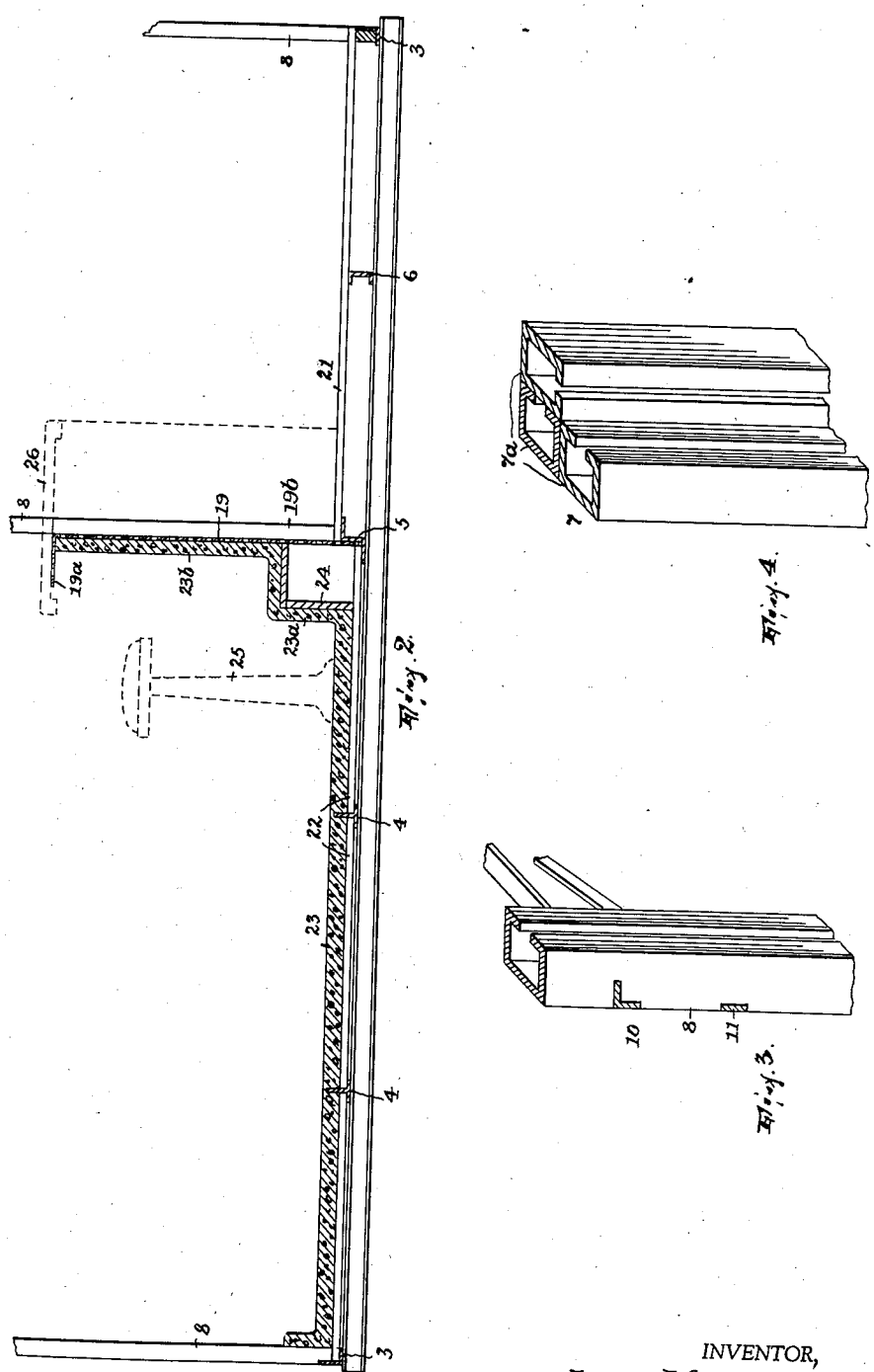

Patented Feb. 8, 1938

2,107,854

UNITED STATES PATENT OFFICE 2,107,854

VEHICLE BODY CONSTRUCTION

Irving B. Cooper, Allendale, N. J.

Application April 21, 1937, Serial No. 138,100

5 Claims. (Cl. 296—22)

This invention relates to the body structure of a car, such as a so-called dining-car, of the class intended to occupy a given site indefinitely or for a long period at a time. The bodies of such cars have to be built to withstand the great strains and stresses to which they are likely to be subjected if the ground at the site which they are to occupy is rough, which very frequently is the case, as well as those incident to considerable loads, as when the car is well patronized. In fact, when the floor-including part of the body is assembled it is usually left appreciably arched so that when the weight of the walls and roof and of the equipment and a given human load are imposed thereon it will not sag. Heretofore said floor-including part of the body has been reinforced by longitudinal trusses, as one at each side, depending from the floor frame between the front and back wheels but a fault in that construction was that the trussing obstructed the free movement of the vehicle over ground which is rough, which is very likely to be the case at the sites usually occupied by these vehicles.

According to this invention the trusses are arranged above the floor frame and they are further embodied in the actual front and back or longitudinal side wall structures of the car body. The front wall of a car body of the instant class is usually provided with end doorways and between them with window openings, being otherwise sheathed and thus closed, whereas the back and end walls are sheathed and thus closed usually throughout. The trussing according to the present invention is as to the front wall structure made to extend from doorway to doorway, being below the window openings, and the trussing as to the back wall extends from end to end thereof and for its full height.

According to the invention, further, there is trussing of the body in a vertical plane between the front and back walls and above the floor structure proper and this is so constructed as to oppose sagging of the floor structure at the mid-point in its area and so as also in the example herein set forth to provide a passage about midway the length of the body from one to the other of the two compartments into which the interior of the body will then be divided.

The result of these improvements is that, without increasing the weight of the body and in fact making it possible to construct a body of given dimensions so that its weight is reduced, the resulting body may be moved unimpeded over rough ground and is adapted to withstand the strains and stresses incident not only to such movement but to heavy loads imposed on it, as when it is well occupied by patrons.

In the drawings,

Fig. 1 is an isometric view of the improved frame of a car body as seen from the front, certain grids being shown more or less diagrammatically;

Fig. 2 is a section in such a plane as, for instance, 2—2 in Fig. 1, with the flooring and other structure not shown in Fig. 1 present;

Fig. 3 is a fragmentary isometric sectional view in about the plane 3—3, Fig. 1; and Fig. 4 is a fragmentary isometric view of a corner column.

The frame structure of the body is composed of steel elements all rigidly connected together, preferably by welding, and wherever these elements are hereafter said to be contiguous to each other it is to be understood that they are preferably invariably rigidly connected together, as by welding.

Referring first to those elements which are included in the floor frame: Near each end of this frame there are the parallel pairs of parallel and suitably spaced cross-beams 1, preferably I-beams. Each pair of cross-beams forms a bed or seat for the body whereby it rests on the running gear, when present, as the wheels of a rear truck and those b of a front truck, there being the usual fifth-wheel support c between the latter truck and the corresponding bed or rest. Their ends, to wit, as to what are to be the front and rear margins of the floor, are connected by L-rails 2 superposed thereon, and these L-rails at their ends, to wit, as to what are to be the end margins of the floor, are connected by L-rails 3, the rails 2 and 3 being so arranged that one flange of each projects horizontally inwardly (such flanges being all in the same plane) and the other projects upwardly. Between and parallel with the L-rails 2 and crossing the several I-beams 1 and reaching at least approximately to the L-rails 3 are four rails two of which at the front are inverted T-rails 4, a third of which is a Z-rail 5 and a fourth of which is a channel rail 6. These rails and the rails 2 are about all equally spaced; the flanges of the rails 4, 5 and 6 extend horizontally. So much constitutes the skeleton or frame of the floor, which latter is completed as hereinafter set forth.

Referring, now, to the uprights which are included in the walls. There are corner columns indicated generally by 7 in Fig. 1 and shown in Fig. 4 as comprising cross-sectionally rectangular members 7a arranged so as in section to present compositely an L. One such column is provided at each corner of the floor frame, being seated on the inwardly projecting flanges of and connected to the rails 2—3 and having its salient angle coinciding with the reentrant angle formed by the upstanding flanges of said rails. Between each two columns 7 is a series of posts 8, each of which may be of the same stock as the posts 7a they being usually equally spaced and resting on the inwardly projecting flanges of and connected to the rails 2—3, inward of their upright flanges. Those uprights 7—8 which are at each end of the body may be connected by a horizontal L-rail 9 arranged approximately at their mid-height. Extending from one to the other of the two posts 8 which next adjoin the columns 7 at the front corners of the body frame is a horizontal L-rail 10 connected to and set into such posts and those intervening between them, being at the same height as the rails 9.

As indicated, the front and rear walls are to afford trusses and this is accomplished as follows: As for the front wall: Tie members in the form of flat rails 11 traverse outwardly and are connected to and set into the various posts traversed by the rail 10. They converge downwardly and are connected to the point of juncture of the middle post 8 and rail 2 and they are connected at their upper or outer ends at least to the respective posts 8 next adjoining columns 7 and preferably to all the other posts 8 which they cross. The posts 8 next adjoining column 7 are preferably supported against the pull of the tie rails 11 in response to load imposed on the floor at its mid-length by braces 12, also in the form of flat bars, each extending from the juncture of one such post 8 and rail 10 to the juncture of the next adjoining post 8 and such rail, being inward thereof. Thus, by each group of interconnected parts 2, 8, 11 and 12 a truss is formed. Tie rails 13, also in the form of flat bars, traverse the various posts 8 of the back wall, also converging downwardly and are connected to the point of juncture of the middle one of such posts 8 with the corresponding rail 2 and having their upper ends connected to the corresponding columns 7 at the extreme upper ends of the latter and being preferably connected to all the intervening posts 8. Here, again, by each group of interconnected parts 8, 13 and 2 a truss is formed.

Thus, with respect to the front side of the frame structure, there are the columns at the ends thereof supporting the roof frame on the floor frame and two series of spaced posts arranged between the transverse vertical mid-plane of said structure and the respective columns and supporting the roof frame on the floor frame and rigidly connected to each of them, said frame structure also including, wholly above the floor frame, downwardly converging rails 11 forming a truss with the floor frame and the posts which respectively next adjoin the columns and rigidly connected to such posts in a horizontal plane midway between the floor and roof frames and with the floor frame at its mid-portion (this construction, by avoiding any truss or other reinforcement below the floor frame, facilitating movement of the vehicle over rough ground while properly supporting the floor and the load at any time imposed thereon), and between each two posts is a space which is clear from post to post and from said horizontal plane to the roof frame, to form a window opening 14a, and between each column and the adjoining post there is a space which is clear from column to post and from floor to roof frame which is also clear, to form a doorway 14.

The roof frame may comprise rails 15—16 connected end to end in rectangular form and resting upon and connected to the various uprights 17 seated at their ends on and connected to the front and back rails 15, and panel elements 18 suitably formed to impart some desired form to the roof, these resting at their ends on and connected to the rails 15—16. The rails 15—16 are preferably flat.

The body is to be further reinforced in a vertical plane approximately between and parallel with its front and back walls and so as to partition off the front from the back portion of the interior but nevertheless to permit access from one to the other of the compartments thus existing. Thus:

There are two grids 19 of heavy sheet metal each rectangular in form and each somewhat less than half the length of said interior of the body and having a transverse dimension appreciably less than from the floor to the roof, or about 3', one longitudinal edge portion forming preferably a right-angle flange 19a, which flanged portion is to form the top margin of the grid; its end margin may also be bent to form right-angular flanges 19b. Each grid, arranged in a vertical plane extending lengthwise of the body, has its opposite or lower margin in face-to-face relation to and connected throughout its length to the Z-rail 5. One end margin, as 19b, of one grid and one such end margin of the other grid are arranged face to face and connected for their full length to the respective posts 8, at the end of the body frame, which coincide with the Z-rail. A space 20 exists between the other ends of the grids, forming a passageway affording communication between the compartments separated by the partitions formed by the grids, the front one of which is for the patrons and the rear one for service. What I seek to accomplish by each grid is to tie the floor frame at some point, as a, near the center of its area, to a point, as b, of a post 8 at each end of the frame and well above the floor level but appreciably below the roof, and this will be accomplished, if the grid is connected to said Z-rail and post at those points; of course, if the connection between the lower grid margin and the Z-rail and between the end margin of the grid and the post is continuous or effectively so there will exist, formed by such rail, post and grid, a system of trusses. Indeed, given the floor and roof frames and uprights, all substantially as set forth, the floor having a longitudinal rail, as 5, extending substantially midway between and parallel with the long sides and rigidly connected at its ends to the short sides of such floor frame, so far as I am aware it is new in this art to provide a rectangular truss-forming partition, as 19, extending lengthwise of the rail from a point adjacent one end of the rail at least to a point approximately midway the length of said rail and upstanding above the rail short of the roof frame and secured to the rail throughout substantially the entire length of such partition.

It is usual in the building of frame structures for car bodies of the instant class to form the floor frame with a camber or arch in any longitudinal vertical plane so as to avoid a sag therein when the remaining part of the body structure is imposed thereon and under whatever load the floor frame is expected to carry. But, according to my construction this camber or arch may be considerably reduced because it is augmented by the trussing afforded by the mentioned grids, which at the same time serve the useful purpose of providing counter-supporting partitions.

The flooring at the service side of the partition afforded by the grids may consist of wood planks 21 laid on the rails 5 and 6 and the end rails 3. At the patron's side of the partitions wood boards 22 may be laid between the rails 2, 4 and 5, resting on their flanges, and a layer of concrete 23 superimposed on the boards and brought to about the level of the flooring at 21.

The concrete 21, adjacent the grids, may be developed over a box-like structure 24, as at 23a, to form a step or foot-rest for patrons seated on the stools 25 at the patrons' side of the grids, and further continued upwardly, as at 23b, over the patrons' side of the grid, thus forming a wall reinforced by the grid. This wall may be surmounted by a counter 26.

It will be understood that except where doorways 14 and window openings, as at 14a are to exist, the portion of the frame comprising the parts above the floor level is to be covered with some enclosing material, as sheet metal.

Having thus fully described my invention what I claim is:

1. The hereindescribed elongated vehicle body frame structure including elongated roof and floor frames, means at one long side of the frame structure to support the roof frame on the floor frame, columns arranged at the ends of the other long side of said frame structure and supporting the roof frame on the floor frame, and two series of spaced posts arranged between the transverse vertical mid-plane of said structure and the respective columns and supporting the roof frame on the floor frame and rigidly connected to each of them, said frame structure also including, wholly above the floor frame, downwardly converging rails forming a truss with the floor frame and with the posts which respectively next adjoin the columns and rigidly connected to such posts in a horizontal plane approximately midway between the floor and roof frames and with the floor frame at its mid-portion, each space between the posts being clear from post to post and from substantially said horizontal plane to the roof frame and the space between each column and the adjoining post being clear from column to post and substantially from floor to roof frame.

2. The hereindescribed elongated vehicle body frame structure including elongated roof and floor frames, means at one long side of the frame structure to support the roof frame on the floor frame, columns arranged at the ends of the other long side of said frame structure and supporting the roof frame on the floor frame, two series of spaced posts arranged between the transverse vertical mid-plane of said structure and the respective columns and supporting the roof frame on the floor frame and rigidly connected to each of them, said frame structure also including, wholly above the floor frame, downwardly converging rails forming a truss with the floor frame and with the posts which respectively next adjoin the columns and rigidly connected to such posts in a horizontal plane approximately midway between the floor and roof frames and with the floor frame at its mid-portion, each space between the posts being clear from post to post and from substantially said horizontal plane to the roof frame and the space between each column and the adjoining post being clear from column to post and substantially from floor to roof frame, and inclined bracing bars respectively supporting the posts which adjoin the columns and being supported by the floor frame and respectively arranged between such posts and rails.

3. The hereindescribed vehicle body frame structure comprising an elongated substantially rectangular floor frame having a horizontal rail extending substantially midway between and parallel with the two long sides and rigidly connected at its ends to the short sides of the floor frame, an elongated substantially rectangular roof frame having its long and short sides in substantially vertical coincidence with the long and short sides, respectively, of said floor frame, uprights rigidly connecting the roof frame and the floor frame and arranged at the several sides of the two frames, and a rectangular truss-forming partition extending lengthwise of the rail from a point adjacent one end of the rail at least to a point approximately midway the length of said rail and upstanding above the rail short of the roof frame and secured to the rail throughout substantially the entire length of said partition.

4. The hereindescribed vehicle body frame structure comprising an elongated substantially rectangular floor frame having a horizontal rail extending substantially midway between and parallel with the two long sides and rigidly connected at its ends to the short sides of the floor frame, an elongated substantially rectangular roof frame having its long and short sides in substantially vertical coincidence with the long and short sides, respectively, of said floor frame, uprights rigidly connecting the roof frame and the floor frame and arranged at the several sides of the two frames, one upright being adjacent to one end of the rail, and a rectangular truss-forming partition extending lengthwise of the rail from the latter upright and rigidly affixed at its said end to the latter above the rail and to the rail throughout substantially the entire length of said partition.

5. The vehicle body frame structure set forth in claim 3 characterized by said partition having a lateral broad face thereof in face to face relation to a lateral longitudinal face of the rail.

IRVING B. COOPER.